US008970479B1

(12) United States Patent
Chang et al.

(10) Patent No.: US 8,970,479 B1
(45) Date of Patent: Mar. 3, 2015

(54) HAND GESTURE DETECTION

(75) Inventors: Samuel Henry Chang, San Jose, CA (US); Weijian Wang, Cupertino, CA (US); Sowmya Gopalan, Cupertino, CA (US); Ning Yao, Cupertino, CA (US); Yuhua Zhu, Fremont, CA (US); Manika Puri, Santa Clara, CA (US)

(73) Assignee: Rawles LLC, Wilmington, DE (US)

( * ) Notice: Subject to any disclaimer, the term of this patent is extended or adjusted under 35 U.S.C. 154(b) by 126 days.

(21) Appl. No.: 13/562,734

(22) Filed: Jul. 31, 2012

(51) Int. Cl.
*G09G 5/00* (2006.01)
*G06F 3/01* (2006.01)

(52) U.S. Cl.
CPC ....................................... *G06F 3/017* (2013.01)
USPC ......................................................... 345/156

(58) Field of Classification Search
CPC ... G06F 3/017; G06F 3/0484; G06F 3/04847; G06F 2203/04104; G06F 2203/04808; G06F 3/005; G06F 3/011; G06F 3/041; G06F 3/048; G06F 3/04842; G06F 3/04845; G06F 3/0485; G06F 3/04855; G06F 3/0486; G06F 3/0487; G06F 3/0488; G06F 3/04883; G06F 3/04886
USPC .................................................. 345/156–184
See application file for complete search history.

(56) References Cited

U.S. PATENT DOCUMENTS

| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 2008/0013826 | A1* | 1/2008 | Hillis et al. .................. 382/154 |
| 2008/0244468 | A1* | 10/2008 | Nishihara et al. ............. 715/863 |
| 2010/0259493 | A1* | 10/2010 | Chang et al. ................. 345/173 |
| 2012/0113241 | A1* | 5/2012 | Sundaresan et al. ........... 348/77 |
| 2012/0223885 | A1 | 9/2012 | Perez |

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Stephen Sherman
(74) *Attorney, Agent, or Firm* — Lee & Hayes, PLLC

(57) ABSTRACT

Techniques are described for detecting a hand gesture made by a user. Fingertips of a hand may be identified and tracked over time. When a user contracts the fingertips from an extended position, hand spread may be calculated based on the area of the hand and fingers. The hand spread over time may be compared to a Gaussian function to evaluate whether the observed motion represents a grasping motion.

19 Claims, 5 Drawing Sheets

HAND GESTURE DETECTION

BACKGROUND

User interfaces have traditionally relied on input devices such as keyboards, which require physical manipulation by a user. Increasingly, however, it is desired to detect and monitor the physical positions and movements of users within a scene or environment. User motions and gestures can be used in some environments as user commands and inputs to automated systems. In particular, hand gestures may be useful in providing input from a user to a computerized system.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes systems and techniques for detecting a hand gesture such as a grasping motion. A sequence of two-dimensional (2D) or three-dimensional (3D) images are analyzed to identify certain conditions or criteria that when satisfied indicate that a user has made a grasping motion.

An initial or prerequisite criterion is that the five fingertips of a hand are visible. If this prerequisite is satisfied, subsequent criteria may be evaluated to determine whether a grasping gesture is subsequently performed. The subsequent criteria may include one or more of the following:

Whether visible fingertips move toward the center of the hand;

Whether the decreasing spread of the hand over time is similar to a Gaussian function or curve; and Whether the spread of the hand decreases by a threshold amount within a time period of a predetermined length.

The spread or extension of the hand may be evaluated by fitting a closed shape such as a polygon or circle to an image of the hand. Initially, the closed shape may be fitted based on the visible fingertips of the hand. The fingertips may eventually become obscured as the grasping motion is performed, and the closed shape may be fitted within other parts of the hand, such as the back of the hand. The area of the closed shape, after being fitted to the hand, is used as an indicator or measurement of the hand spread.

Example Environment

Figure 1:
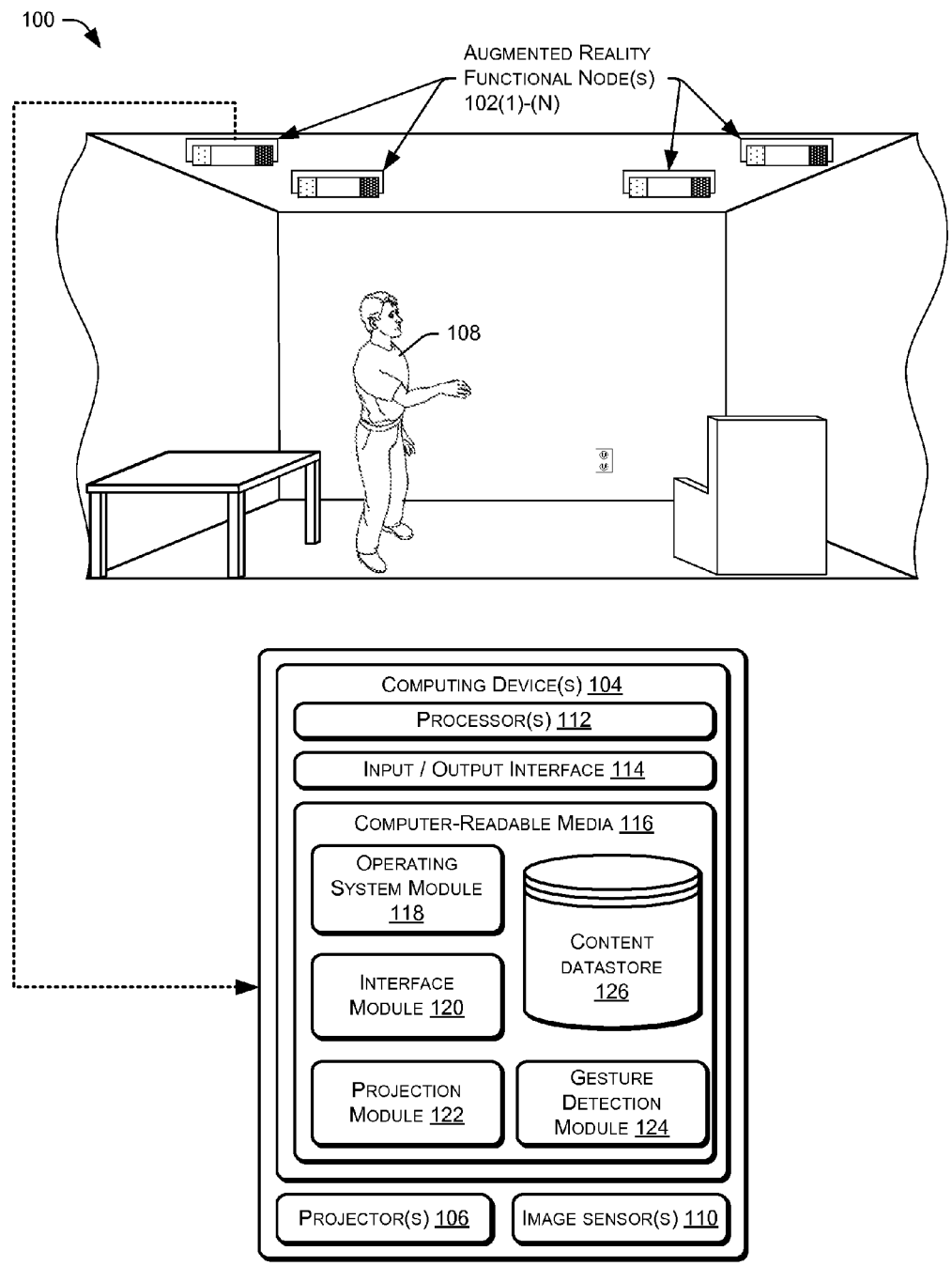
FIG. 1 illustrates an environment that includes an augmented reality functional node (ARFN) that detects and responds to hand gestures.

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices.

As illustrated, each ARFN 102 may include one or more computing devices 104, as well as one or more projectors 106 that, when active, may project content onto any surface within the environment 100. The projected content may include electronic books, videos, images, interactive menus, or any other sort of visual content.

For instance, a user 108 within the environment may request that the ARFN 102 project a particular electronic book that the user wishes to read. In response, the ARFN 102 may project the book onto a projection surface within the environment. In another example, the user may request that the ARFN 102 project a particular movie or show that the user wishes to watch. In response, the ARFN 102 may obtain the content (locally or remotely) and may project the content onto a surface in the environment. In yet another example, the ARFN 102 may be configured to project a user interface (UI), such as a keyboard, a slider bar, a virtual remote control to operate a television within the environment 100, or any other type of UI.

The ARFN 102 may include one or more cameras or other image sensors 110 that may capture images of the user 108 operating the UI and, in response, the ARFN 102 may provide feedback to the user 108 and/or may cause performance of actions corresponding to the user's actions. For instance, when the ARFN 102 projects a remote control, the ARFN 102 may provide feedback to the user 108 indicating which button(s) a user is in position to select, may identify a user's selection (e.g., a selection to power on the television) and, in response, may operate the television according to identified selections. While a few examples have been given, it is to be appreciated that the ARFN 102 may project any other sort of content within the environment 100. Furthermore, the ARFN 102 may recognize and interpret gestures that are made by the user without projecting images within the environment and without reference to a visual UI.

The image sensor(s) 110 may include optical cameras, ranging devices, and other types of devices, which may utilize various technologies to obtain and record characteristics of user movement within the environment 100. For example, a 2D camera may be used to capture sequences of optical images, from which features such as hands and fingertips may be detected. Other types of images devices may alternatively be used to detect positions and 3D characteristics of objects within the environment, such as range finding devices, distance sensors, and imaging devices that capture depth information. Various technologies may be used for evaluating depth, including time-of-flight technologies and structured light analysis.

As illustrated, the computing device 104 of the example ARFN 102 includes one or more processors 112, an input/output interface 114, and computer-readable media 116. The processors 12 may be configured to execute instructions, which may be stored in the computer-readable media 116 or in other computer-readable media accessible to the processors 112.

The input/output interface 114, meanwhile, may be configured to couple the computing device 104 to other components of the ARFN 102, such as the projector 106, the image sensor 110, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the projector 106 or the image sensor 110. Therefore, it is to be appreciated that the illustration of the ARFN 102 of FIG. 1 is for illustrative purposes only, and that components of the ARFN 102 may be configured in any other combination and at any other location.

The computer-readable media 116 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 116 may reside within a housing of the ARFN, on one or more storage devices accessible on a local network, on cloud storage accessible via a wide area network, or in any other accessible location.

The computer-readable media 116 may store several modules, such as instructions, datastores, and so forth that are configured to execute on the processors 112. For instance, the computer-readable media 116 may store an operating system module 118, an interface module 120, a projection module 122, a gesture detection module 124, and a content datastore 126.

The operating system module 118 may be configured to manage hardware and services within and coupled to the computing device 104 for the benefit of other modules. The interface module 120 may be configured to receive and interpret commands received from users within the environment 100. For instance, the interface module 120 may analyze and parse images captured by the camera image sensor 110 to identify hand gestures made by users within the environment 100. In response to identifying a predefined gesture, the interface module 120 may interpret the gesture and cause the ARFN 102 to perform a corresponding action.

For instance, if a user within the environment 100 makes a gesture requesting that the ARFN 102 project a certain piece of content, then the interface module 120 may interpret the gesture and cause the projection module 122 to project the content via the projector 106.

The computer-readable media 116 may contain other modules, which may be configured to implement various different functionality of the ARFN 102, including the techniques described below. The ARFN may similarly include various other types of sensors and transducers, content generation devices, and so forth, including microphones, speakers, actuators, sensors, and so forth.

Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

Example Operation

Figure 2:
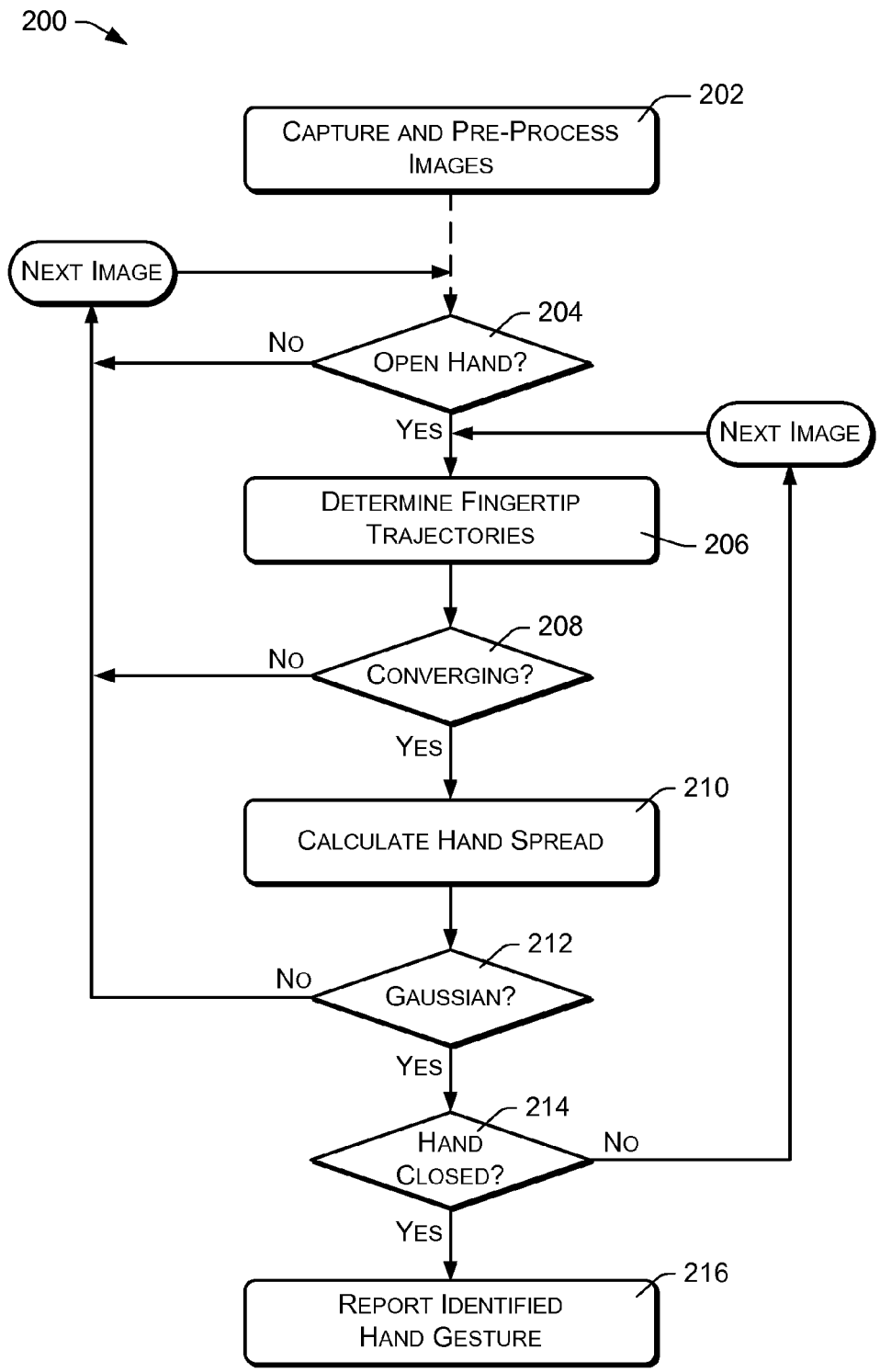
FIG. 2 is an example flow diagram of detecting a hand gesture.

FIG. 2 illustrates an example method or process 200 of monitoring an environment and detecting a hand gesture made in the environment. An action 202 comprises capturing and analyzing a time-based series or sequence of images that potentially include a hand of a user within the environment. The action 202 may be performed using the image sensor(s) 110 of the ARFN 102 or by using other sensing equipment such as 3D sensors, range finders, proximity sensors, and so forth. The images may comprise 2D optical images and/or 3D depth images such as depth maps.

The captured images may be analyzed in various ways, utilizing appropriate combinations and sequences of edge detection, shape recognition, color analysis, pattern analysis, and other techniques. Depending on the nature of the images obtained in the action 202, the analysis may be performed as a two-dimensional analysis or part of a three-dimensional analysis. In certain embodiments, the 3D orientation of the hand may be initially determined based on a 3D image, and the 3D image may be rotated or transformed to produce a 2D image in which the hand is viewed from a generally perpendicular angle to a plane that most closely corresponds to the palm of the hand.

Figure 3:
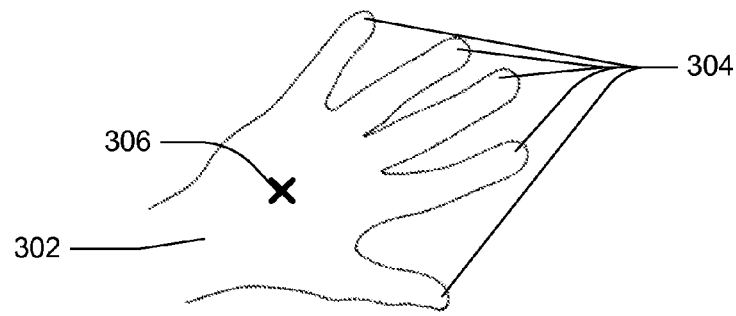
FIGS. 3-8 are diagrams of a hand that is analyzed in accordance with the techniques shown by FIG. 2.

FIG. 3 shows an example of a hand 302 that may be detected within an image and analyzed in accordance with the action 202 and in accordance with further actions that will be described below. The hand 302 has been rotated or transformed into a 2D plane, viewed from an angle that is perpendicular to the 2D plane that is roughly formed by the back or palm of the hand.

In addition to capturing an image of the hand, the action 202 may include detecting the outline or contour of the hand, and further detecting or determining locations of certain hand features, such as fingertips 304 and a hand center 306.

More generally, the action 202 represents some amount of image preprocessing to produce image data for further processing by subsequent actions of the illustrated method 200. For example, the action 202 may analyze captured images to detect the presence and location of any hand within the images, and to detect and/or locate one or more hand features or landmarks. Hand features or landmarks may include fingers, fingertips, finger valleys, back of the hand, center of the hand, the wrist, and so forth.

Returning to FIG. 2, the action 202 produces a series of images and/or corresponding image data that may be subject to further analysis in the actions that will be described below. The actions subsequent to the action 202 are repeated with respect to sequential images produced by the action 202. The image and/or corresponding image data that is currently the object of these actions will be referred to below simply as the current image.

An action 204 may comprise determining or detecting an initial gesture condition. In one embodiment, such an initial gesture condition may comprise an open hand, demonstrated by the visibility of a certain number of fingertips, such as all five fingertips of a human hand, within the current image. As an example, FIG. 3 shows an image that satisfies this condition.

If the initial condition is not found in the current image, the process moves to the next image produced by the action 202, and the action 204 is repeated with respect to the next image. If the initial condition is found as a result of analyzing the current image, the process moves to an action 206.

The action 206 comprises determining trajectories of any detected fingertips within the current image. This may be performed by comparing the positions of the fingertips in the current image with their positions in a previous image.

A subsequent action 208 comprises determining whether the detected fingertips are converging or moving toward the center of the hand. If the fingertips are not converging, the process moves on to the next image and restarts at the action 204, again determining whether the initial condition is satisfied in the newly current image. If the fingertips are converging, the process moves to an action 210.

The action 210 comprises calculating and/or recording the observed spread of the hand over time. The spread of the hand, which may also be referred to as the hand extent, may be considered to correspond roughly to a two-dimensional area that is covered or occupied by the hand and its fingers. In certain embodiments, the hand spread may be considered to be the two-dimensional area of the hand itself as observed from the back of the hand. In the embodiment described herein, hand spread is approximated by fitting a closed shape to detected hand features, as will be described below. Other ways of estimating hand spread may also be used in other embodiments.

Figure 4:
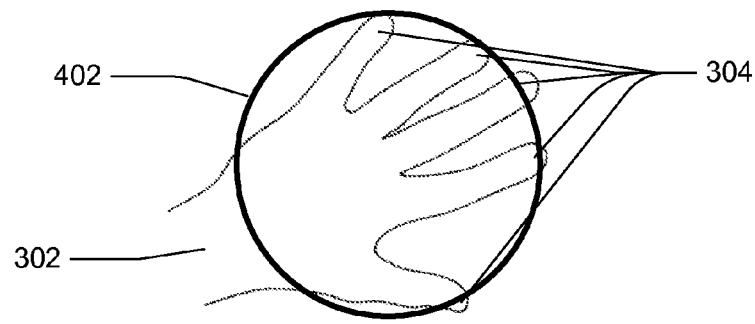

FIGS. 4-8 illustrate an example of calculating or estimating hand spread over time. In FIG. 4, the hand 302 is open and all five fingertips 304 are visible. When three or more fingertips 304 are visible, spread may be estimated by fitting a predefined closed shape to the fingertips 304. In this example, a circle 402 has been fitted to the five fingertips 304. In other embodiments a polygon or other radially symmetric shape may be fitted to the visible fingertips 304 to estimate spread of the hand. In certain embodiments, the area of the circle may be equated to the hand spread.

Figure 5:
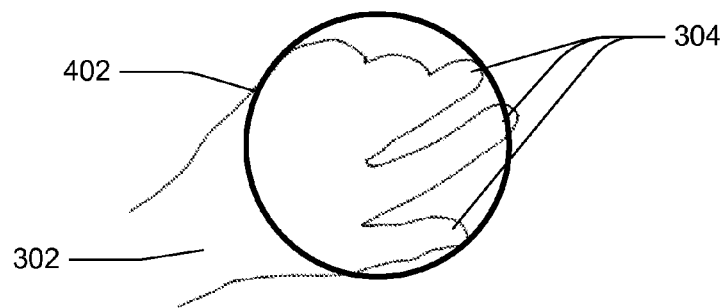

In FIG. 5, the fingers of the hand 302 have started closing: two of the fingers have merged and the corresponding fingertips are either not visible or undetectable. Three fingertips 304 are visible, and the circle 402 is fitted to these visible fingertips to estimate the spread of the hand 302.

Figure 6:
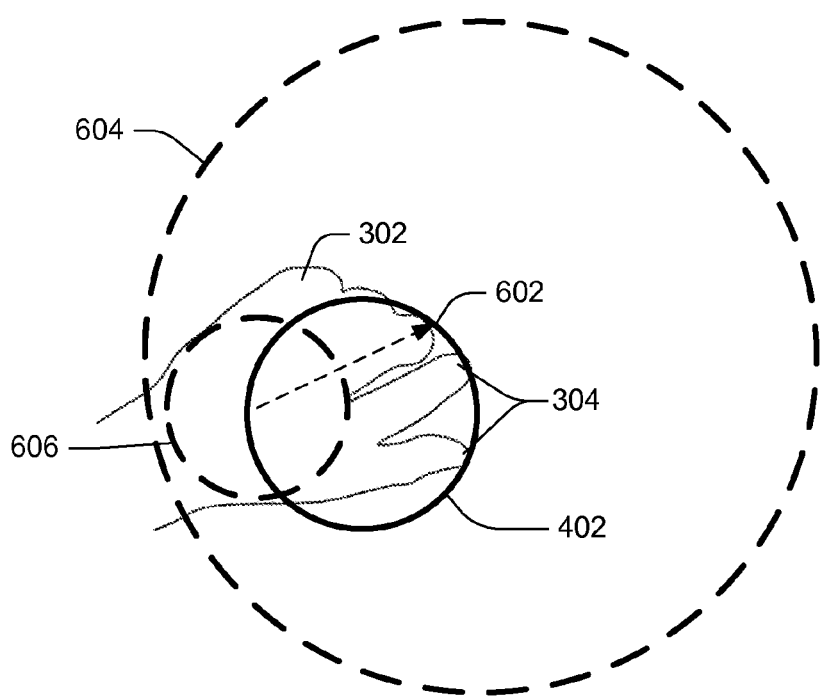

In FIG. 6, only two of the fingertips 304 are visible, and the circle 402 is fitted to these two points and an additional point 602 that is determined as follows: 1) construct a bounding circle 604 using any fingertip position as a center and an initial maximal length of a human hand, for instance 10 inches, as a radius; 2) extract the portion of the hand 302 that is within the bounding circle 604; 3) construct an inscriptional circle 606, as the largest circle that can fit within the contour of the hand 302 as partially defined by the bounding circle 604; and 4) find the point on the contour of the extracted hand—other than one of the visible fingertips 304—that is at the largest distance from the center of the inscriptional circle 606. Again, the area of the circle 402 is used as an indication of the spread of the hand 302.

Figure 7:
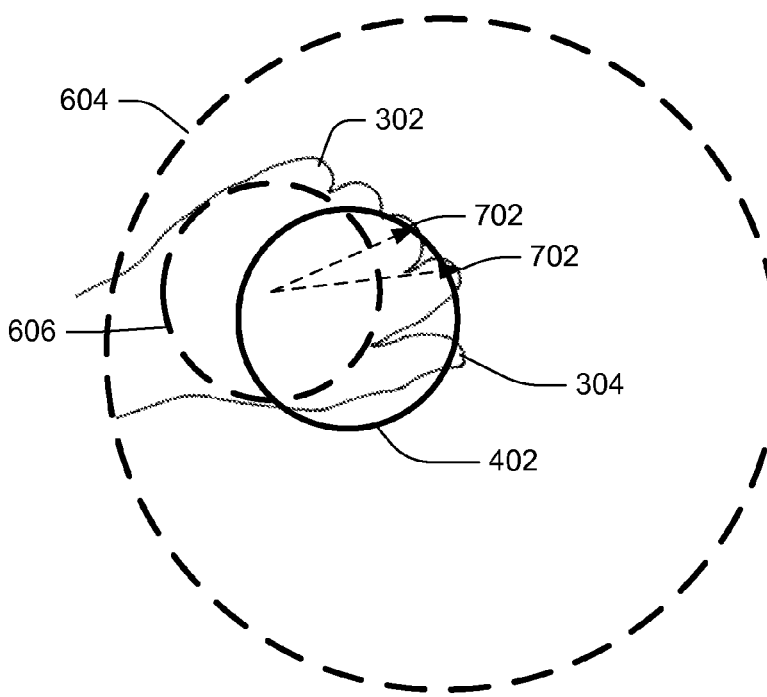

In FIG. 7, the hand 302 has closed to the point where only a single fingertip 304, the thumb, is visible or detectable. At this point, the circle 402 or other closed shape may be fitted to the visible fingertip 304 and two other points 702 that are calculated similarly to the point 602 of FIG. 2.

Figure 8:
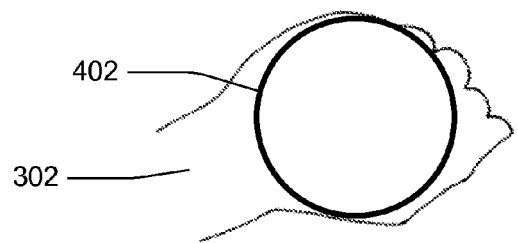

In FIG. 8 where no fingertips are visible, the circle 402 is taken as an inscriptional circle constructed as described above, so that the inscriptional circle occupies a maximum area within the contour of the hand.

An action 212 is performed to determine if the observed motion of the hand has characteristics of a grasping motion. The action 212 comprises determining whether the observed spread of the hand over time estimates a predetermined profile. More specifically, the action 212 comprises calculating an area curve corresponding to the observed spread of the hand over time, and comparing the area curve to a reference function or curve. In the described embodiment, the reference function may comprise the second half of a Gaussian function. Thus, if the area curve approximates portion of a Gaussian curve, the observed hand motion is deemed to be consistent with a grasping gesture, and an action 214 is performed to determine whether the hand has closed to complete the gesture. Otherwise, if the observed hand spread does not exhibit a Gaussian nature, the observed motion is deemed to not be a grasping gesture, and the process starts again with the next image at the action 204.

Figure 9:
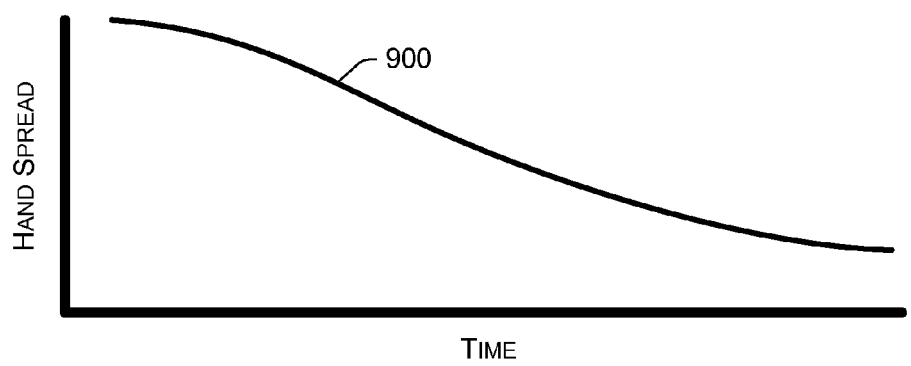
FIG. 9 is an example of an energy curve as computed in accordance with the techniques shown by FIG. 2

FIG. 9 shows an area curve 900 such as might be produced in the action 212. The horizontal axis of the curve 900 corresponds to time. The vertical axis corresponds to hand spread or area of hand spread. A natural hand grasp gesture may be expected to produce continued decrease in spread or area that is approximately Gaussian.

The action 212 may be performed by performing a least squares fit of a Gaussian curve to the area curve 900, and then computing the sum of the squares of errors between the corresponding points of the fitted Gaussian curve and the area curve over time. If this sum does not exceed a specified threshold, the area curve may be considered to match or fit the Gaussian curve. An appropriate threshold may be determined based on the results of experimentally analyzing grasping gestures made by numerous different users.

An action 214 comprises determining whether the hand has closed, such as when the fingertips have been brought together under the palm of the hand. In the described embodiment, this condition is evaluated with reference to the previously recorded spread of the hand over time, performed in the action 210. Specifically, the hand is considered to be closed if the current spread of the hand, as indicated by the area of a fitted geometric shape as described above, has decreased by a threshold amount from its initial value or to below a threshold value. As described above, hand spread is indicated by the area of a closed shaped such as a circle that has been fitted to the fingertips and/or contour of the hand.

In some embodiments, the action 214 may include determining whether the hand spread has decreased by the requisite amount within a time period of a predefined length, or within a predefined time subsequent to detecting the fingertips, If the hand has not closed, the described actions are repeated starting at the action 206: fingertip trajectories are confirmed and further hand spreads are recorded. If the hand has closed, an action 216 is performed of identifying and/or reporting the grasping gesture.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A system comprising:
one or more processors;
an image sensor; and
one or more computer-readable media storing computer-executable instructions that, when executed by the one or more processors, cause the one or more processors to perform acts comprising:
capturing a series of images of a hand using the image sensor;
analyzing, at least in part, the images to detect fingertips of the hand;

subsequent to detecting the fingertips, further analyzing the images to determine a spread of the hand over time; and identifying a hand grasp gesture based at least in part on (a) whether the spread of the hand over time corresponds to a Gaussian function and (b) whether the spread of the hand decreases by a threshold amount subsequent to detecting the fingertips.

2. The system of claim 1, wherein identifying the hand grasp gesture is further based at least in part on whether the spread of the hand decreases by the threshold amount within a predefined time subsequent to detecting the fingertips.

3. The system of claim 1, wherein identifying the hand grasp gesture is further based at least in part on whether the fingertips move toward a center of the hand subsequent to detecting the fingertips.

4. The system of claim 1, the acts further comprising:
further analyzing the images to determine a contour of the hand within each of the images; and
fitting a closed shape to the determined contour of the hand within each of the images to determine the spread of the hand over time.

5. The system of claim 1, the acts further comprising:
determining positions of the detected fingertips in each of the images; and
fitting a radially symmetric closed shape to the determined positions of the fingertips of the hand in each of the images to determine the spread of the hand over time.

6. The system of claim 1, the acts further comprising:
further analyzing the images to determine a contour of the hand within each of the images; and
maximizing a size of a predefined shape within the determined contour of the hand to determine the spread of the hand over time.

7. A method, comprising:
determining a spread of a hand over time;
comparing the spread of the hand over time with a Gaussian function, the Gaussian function associated with a transition of the spread of the hand over time from an open hand, where fingers are spread outwards respective to a palm of the hand, to a closed hand, where the fingers have converged towards a palm of the hand; and
identifying a hand gesture based at least in part on the comparing.

8. The method of claim 7, wherein identifying the hand gesture is further based at least in part on whether the spread of the hand decreases by a threshold amount over time.

9. The method of claim 7, wherein identifying the hand gesture is further based at least in part on whether the spread of the hand decreases by a threshold amount within a time period of a predefined length.

10. The method of claim 7, further comprising:
determining a contour of the hand over time; and
fitting a closed shape to the determined contour of the hand to determine the spread of the hand over time.

11. The method of claim 7, further comprising:
determining positions of fingertips of the hand over time; and
fitting a closed shape to the determined positions of the fingertips determine the spread of the hand over time.

12. The method of claim 7, further comprising:
determining a contour of the hand over time; and
maximizing a size of a predefined shape within the determined contour of the hand to determine the spread of the hand over time.

13. One or more non-transitory computer-readable media storing computer-executable instructions that, when executed by one or more processors, cause the one or more processors to perform acts comprising:
detecting fingertips of a hand;
subsequent to detecting the fingertips, determining a spread of the hand over time;
comparing the spread of the hand over time with a Gaussian function, the Gaussian function associated with a range of the spread of the hand over time; and
identifying a hand gesture based at least in part on the comparing.

14. The one or more non-transitory computer-readable media of claim 13, wherein the spread of the hand is defined at least in part by the detected fingertips.

15. The one or more non-transitory computer-readable media of claim 13, wherein identifying the hand gesture is further based at least in part on whether the spread of the hand decreases by a threshold amount over time.

16. The one or more non-transitory computer-readable media of claim 13, wherein identifying the hand gesture is further based at least in part on whether the spread of the hand decreases by a threshold amount within a time period of a predefined length.

17. The one or more non-transitory computer-readable media of claim 13, the acts further comprising:
determining a contour of the hand over time; and
fitting a closed shape to the determined contour of the hand to determine the spread of the hand over time.

18. The one or more non-transitory computer-readable media of claim 13, the acts further comprising:
determining positions of the fingertips over time; and
fitting a closed shape to the determined positions of fingertips to determine the spread of the hand over time.

19. The one or more non-transitory computer-readable media of claim 13, the acts further comprising:
determining a contour of the hand over time; and
maximizing a size of a predefined shape within the determined contour of the hand to determine the spread of the hand over time.

* * * * *